United States Patent
Jaspers

(10) Patent No.: US 6,867,802 B2
(45) Date of Patent: Mar. 15, 2005

(54) CAMERA WITH COLOR FILTER

(75) Inventor: Cornelis Antonie Maria Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 820 days.

(21) Appl. No.: 09/838,853

(22) Filed: Apr. 20, 2001

(65) Prior Publication Data

US 2002/0021363 A1 Feb. 21, 2002

(30) Foreign Application Priority Data

Apr. 20, 2000 (EP) ............................................ 00201487

(51) Int. Cl.[7] .................... H04N 3/14; H04N 5/335; H04N 9/04; H04N 9/083
(52) U.S. Cl. .................... 348/273; 348/272; 348/280
(58) Field of Search .................. 348/272, 273, 348/274, 275, 276, 277, 278, 279, 280, 281, 282, 283

(56) References Cited

U.S. PATENT DOCUMENTS 5,305,096 A  4/1994 Yamagami et al. ......... 348/242
5,579,047 A  11/1996 Yamagami et al. ......... 348/242

FOREIGN PATENT DOCUMENTS

EP  0461615 B1  12/1991

Primary Examiner—Andrew Christensen
Assistant Examiner—Brian Genco
(74) Attorney, Agent, or Firm—Aaron Waxler

(57) ABSTRACT

A color camera comprises a light sensitive area (13) comprising light sensitive elements, and a color filter layer (12) associated with the sensitive elements comprising Red, Green and Blue (R-G-B) filter layer elements. The color filter layer (12) comprises a repetitive sub-pattern of eight adjacent lines or columns, which sub-pattern comprises color filter elements in the following sequence:

line (column) 1: G-R
line (column) 2: B-G
line (column) 3: G-R
line (column) 4: G-B
line (column) 5: G-R
line (column) 6: B-G
line (column) 7: R-G
line (column) 8: B-G.

6 Claims, 2 Drawing Sheets

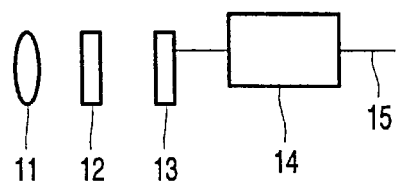
FIG. 1
FIG. 2
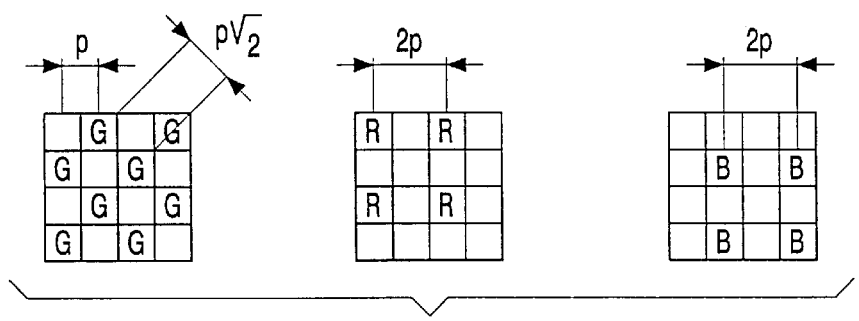
FIG. 3
FIG. 4

CAMERA WITH COLOR FILTER

The invention relates to a color camera with light sensitive area comprising light sensitive elements and a color filter layer associated with the sensitive elements comprising Red, Green and Blue (R-G-B) filter layer elements, and to an image sensor for use in such a camera.

U.S. Pat. No. 5,305,096 discloses an image signal processing apparatus comprising an image pick-up device driven in an interlaced manner, a color filter having portions for passing luminance components in an offset manner, and a memory for storing the signal read out from the image pick-up device without sub-sampling it.

In a known color camera, the color filter layer filters the light incident on the color filter layer such that only light having a certain spectral characteristic (e.g. color) is passed and hits the light sensitive element under with the color filter layer. The color filter layer is structured such that a light sensitive element is associated with a color filter element. The color filter elements in the known camera filter red blue and green light and thus form a RGB (RED-GREEN-BLUE) color filter array.

The known color filter layer comprises a repetitive pattern of groups of four color filter elements arranged in quartets, comprising a first line consisting of a Green and a Red color filter element and a second line consisting of a Blue and Green filter element. When an image is taken, each of the light sensitive elements is read, and basically three different color images are read, a blue, a green and a red one. The data of the sensitive elements is converted into a signal in which signal also the 'missing pixels' in the signals, e.g. for the 'red signal' a signal corresponding to the position of the pixels under a green or red color filter element, are reconstructed by means of an averaging technique. The resulting signals are signals of high quality.

Although the known camera offers a good quality image signal, this is only true when the camera is used in the still picture mode. When it is attempted to use the known camera in a video mode (i.e. a mode in which a large number of picture frames is recorded per second) the image reproduction is dramatically worse due to discarding of rows of the sensor. Using the camera in a video mode may for instance be necessary or advisable when the camera is used for video fragments transmitted over the internet. Furthermore in still cameras a video mode is often used for auto-functions, such as auto-focusing, auto white balance and auto-exposure. Said functions often do not work properly when the camera is aimed at objects which comprise a horizontally arranged repetitive structure such as for instance horizontally aligned venetian blinds. Many objects have a horizontally aligned structure, for instance brickwork. Often strong Moiré interference patterns between on the one hand the repetitive pattern of missing lines and on the other hand the horizontally repetitive pattern of the object occur. Not only do such Moiré patterns give a distorted picture (comprising brighter and darker lines) but also they make auto-focusing and other auto-functions difficult if not impossible to use.

It is, inter alia, an object of the invention to provide a camera with an increased quality of image reproduction when used in a video mode, and an image sensor for use in such a camera. To this end, the invention provides a camera and image sensor as defined in the independent claims. Advantageous embodiments are defined in the dependent claims.

As shown in FIG. 5, the color filter layer comprises a repetitive sub-pattern of eight adjacent lines or columns, the sub-pattern comprising color filter elements in the following sequence:

line (column) 1: G-R
line (column) 2: B-G
line (column) 3: G-R
line (column) 4: G-B
line (column) 5: G-R
line (column) 6: B-G
line (column) 7: R-G
line (column) 8: B-G.

It will be clear that, given the fact that the pattern is a repetitive pattern, the numbering (but not the sequence) of the lines may be arbitrarily chosen. Any of the above lines 1 to 8 may be renumbered to line 1 as long as the sequence of the lines is preserved. The lines can be renumbered, for instance such that each line n (for n=2 to 8) becomes line n-1, and line 1 becomes line 8. Each line n may also become line n-2 (for n=3 to 8), line 1 becoming line 7, line 2 becoming line 8, etc., etc., i.e. any commutation of this pattern is within the scope of the invention.

The invention is based on the insight that the known (R,G,B) color filter pattern is not well suited for the commonly used video mode signals. Video mode signals are usually taken by a video camera. A video mode camera has a color filter array, which color filter array, however, is not formed by red, green and blue color filter elements, but by Green (G), Yellow (Ye), Cyan (Cy) and Magenta (Mg) color filter elements. The arrangement of these color filter elements is as shown in FIG. 2, i.e. four lines in the following arrangement:

line 1: Cy-Ye
line 2: G-Mg
line 3: Cy-Ye
line 4: Mg-G

Video mode signals correspond to such an arrangement of color filter elements.

The data from the known color camera having RGB color filter elements does not lend itself to be easily converted into video mode signals. This means that very complicated calculations must be made for such conversion, which add costs and time, which is not always available especially not in a real time mode or, and this usually done, some of the information must be thrown away. Such throwing away of data reduces strongly the image quality. The sample frequency of the video signal is strongly reduced. On top of this diminishing of the image quality, the data is not thrown away at random, but lines of data are neglected. This results in Moiré patterns in the image, which further reduce the image quality. In fact, for customers the completely incomprehensible situation occurs that the better the quality of the camera is when used in the still picture mode, often the worse the camera operates in the video picture mode and/or the auto-functions of the camera perform. The quality of the still camera increases as the sensor comprises more pixels. However, when used in the video mode, the number of pixels is limited. Thus more lines are thrown away, which increases the chance on the occurrence of Moiré patterns and malfunctioning of auto-functions.

The data from a color filter camera with a color filter array in accordance with the invention does lend itself, however, to be easily converted in video mode signals, without having to throw away some of the data and with only a minimal reduction in sampling frequency. Some steps in this conversion may even be done in situ, i.e. on the sensitive array itself, which increases the speed with which data can be read and converted.

As a consequence a camera in accordance with the invention is able to provide good image quality both in still picture mode as well as in video mode.

These and other aspects of the invention will be apparent from and elucidated with reference to the embodiments described hereinafter.

In the drawings:

FIG. 1 schematically shows a color camera;

FIG. 2 shows a known RGB filter array;

FIG. 3 shows the sample structure of the RGB pixels of FIG. 2 and the pitch of the RGB colors obtained by said color filter;

FIG. 4 shows a known filter array often used for video cameras;

The Figures are not drawn to scale. In general, like reference numerals refer to like parts.

Figure 5:
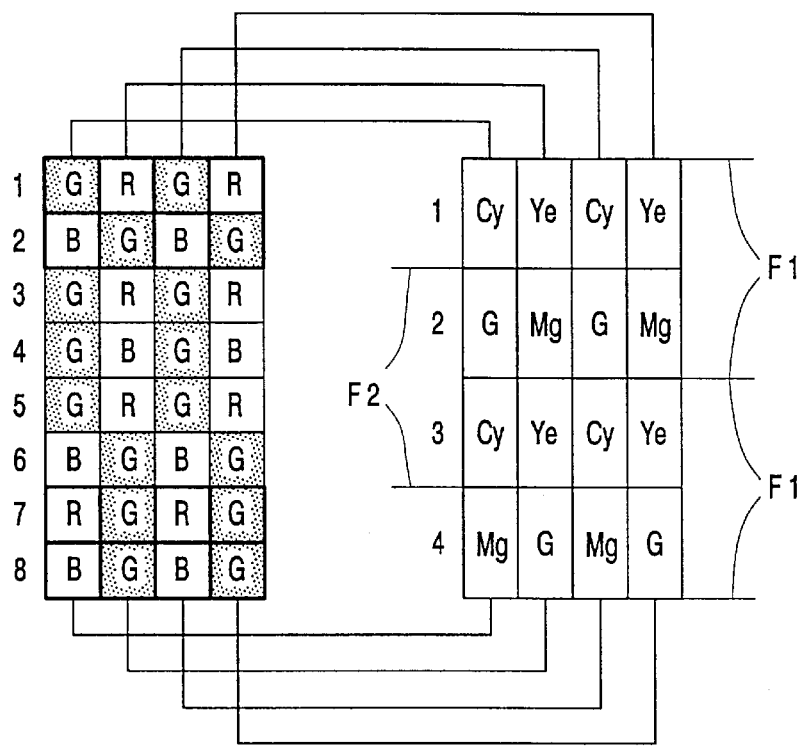
FIG. 5 shows a color filter array in accordance with the invention and the filter array of FIG. 4.

FIG. 1 shows schematically a camera system comprising a lens 11, a color filter array 12, and an image pick-up device 13 coupled to a signal processing system 14 to generate signals 15. Incident light from a scene passes through the lens 11 and through the optical filter array 12 to form an optical image on the image pick-up device 13. The electrical signal produced on the image pick-up device is read out and is then processed in the signal processing system to generate signals 15. Said signals may be sent to recording or displaying devices.

FIG. 2 shows a known color filter array. The array is comprised of a repetitive pattern of 4 color filter areas in the sequence:

G-R
B-G

Such a color filter array can be advantageously used for still picture cameras.

FIG. 3 shows the sample structure of the RGB pixels and the pitch of the RGB colors. The pitch p is the distance between two neighboring pixels having the same color. Its inverse value represent the pixel or system clock frequency in the case of a single RGB output of the sensor, i.e. fs=1/p. The sample frequency of each RGB color is inversely proportional ti the shortest distance between the pixels of each RGB color, i.e. a horizontal and vertical sample frequency of ½p=fs/2 for the Red and Blue colors and a sample frequency of 1/p√2=fs/√2 for Green. The more data, or the larger the area over which the data have to be sampled for a particular signal the lower the sample frequency and the less the image detailed the image.

FIG. 4 shows a color filter array which is used for video recordings. Cy stands for Cyan, which is the combination of Green and Blue, Yellow (Ye) is formed by the combination of Red and Green and Magenta (Mg) is formed by the combination of Red and Blue. This color filter array is much more complex and in fact has a smallest repetitive array of 4×4 elements. Signals in video mode correspond to such a color filter array.

The signals from a color picture camera having a RGB color filter array can and often are used to display images in a video mode (for instance an NTSC video mode). In order to do so, the signals of the color camera (representing pixels in RGB in a particular pattern) must be converted into signals representing G,Y,Cy,Mg pixels in a particular pattern. This conversion, using the known RGB color pattern is less than optimal. In a still camera a video mode is also often used for auto functions such as auto-focusing.

A standard video mode signal (i.e. the sequence of data) is in accordance with the pattern of color filters elements as shown in FIG. 4.

The data from the known color camera having RGB color filter elements (FIG. 2) do not lend itself to be easily converted into video mode signals. In order to do so, Green and Blue data signals must be combined to give a Cy signal at the right position, Red and Green signal must be combined to give a Ye signal at the right position etc. However, when the color filter patterns are compared it is clear that the positions of the R, G and B color filter arrays (and thus of the RGB pixels and RGB data) do not correspond to the positions of the G, Ye, Cy and Mg color filter arrays. This means that very complicated calculations must be made for such conversion, which add costs and time, which is not always available especially not in a real time mode or, and this usually done, some of the information must be thrown away. Such throwing away of data reduces strongly the image quality. The sample frequency of the video signal is strongly reduced. On top of this diminishing of the image quality, the data is not thrown away at random, but lines of data are neglected. This results in Moiré patterns in the image, which further reduce the image quality.

FIG. 5 shows side-by-side the RGB color filter array of the present invention (left hand side) and the G, Y, Cy, Mg color filter array as used in video mode applications. It is remarked that when the color filter array of FIG. 5, left hand side is compared to the known color filter array it will be clear that the difference lies in the rows 4 and 7. In the known RGB color filter array, line 4 is equal to line 2 and line 7 is equal to line 5 and equal to line 1. In the RGB color filter array in accordance with the invention, the pattern of line 4 is shifted one column to the left or the right in respect to the pattern of line 2, the pattern of line 7 is shifted one column to the left or the right in respect to the pattern of line 1. When the left and right hand sides of FIG. 5 are examined it is clear that there is a simple and direct mapping possible of the RGB color filter pattern (left hand side) on the Cy, Ye, G, Mg color filter pattern on the right hand side. Some of these mappings have been indicated in FIG. 5. No data needs to be thrown away or to be shifted of its place. The calculations and conversions of data are very simple. As a consequence the sampling frequency is much less reduced and the image quality improved. Since there are no or hardly no lines of data to be discarded, Moiré problems are strongly reduced. In one embodiment of the color camera in accordance with the invention the camera comprises a QGA RGB sensor array having 1260×960 color pixels. Using such a QGA sensor the following options are available:

1. high resolution (1260×960) still picture RGB mode.
2. VGA (640×480) still picture mode by combining rows 1+2, 3+4, etc. This is basically what is shown by the lines connecting the left and right hand sides of FIG. 5.
3. NTSC video mode with 2×240 interleaving lines. By combining the proper four sequential vertical rows the interlaced fields 1 and 2 are achieved. In FIG. 5 rows 1+2+3+4 and 5+6+7+8 give field 1, rows 3+4+5+6 and 7+8+1+2 give field 2.
4. CIF mode with 240 lines (and 315 horizontal pixels) can be achieved using only one field. By down-sampling in the horizontal direction the 315 horizontal pixels are achieved.

In another embodiment of the color camera in accordance with the invention the camera comprises a XGA RGB sensor array having 1280×1024 color pixels. Using such a XGA sensor the following options are available:

1. high resolution (1280×1024) still picture RGB mode.
2. PAL video mode with 2×256 interleaving lines. By combining the proper four sequential vertical rows the interlaced fields 1 and 2 are achieved. In FIG. 5, rows 1+2+3+4 and 5+6+7+8 give field 1 (F1), rows 3+4+5+6 and 7+8+1+2 give field 2 (F2).
3. CIF mode with 256 lines (and 340 horizontal pixels can be achieved using only one field. By down-sampling in the horizontal direction the 320 horizontal pixels are achieved.

Figure 6:
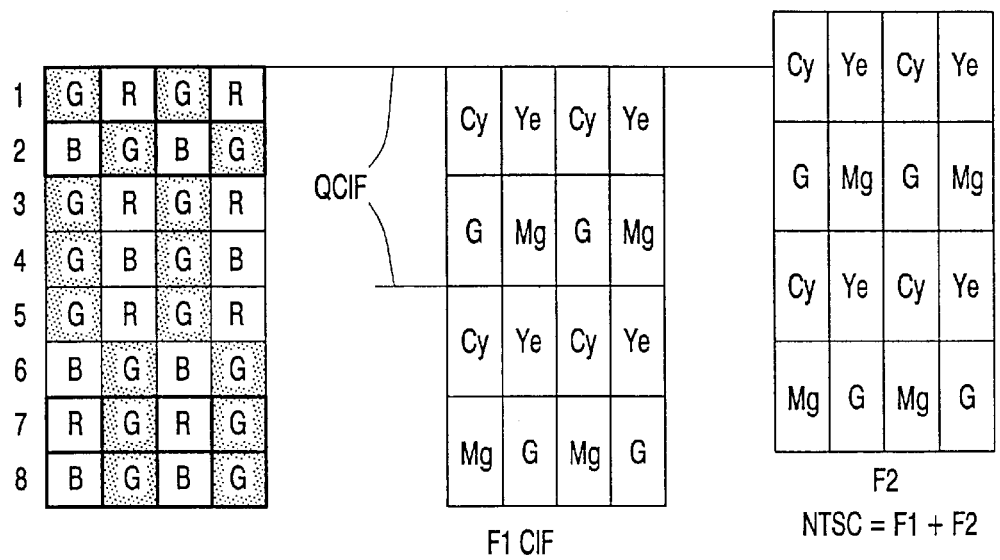
FIG. 6 illustrates the options available for a VGA RGB sensor array having 640×480 color pixels.

In another embodiment the color camera in accordance with the invention comprises a VGA RGB sensor array having 640×480 color pixels. Using such a VGA sensor the following options are available (see also FIG. 6):
1. still picture RGB mode (640×480).
2. NTSC video mode with 2×240 interleaving lines. By combining the proper four sequential vertical rows the interlaced fields 1 and 2 are achieved. Processing rows 1+2, 3+4 etc. results in field 1 (F1), processing rows 2+3, 4+5 etc gives field 2 (F2).
3. CIF mode with 240 lines (and 315 horizontal pixels) can be achieved using only one field. By down-sampling in the horizontal direction the 315 horizontal pixels are achieved.
4. QCIF mode with 120 lines can be achieved by adding 4 rows.

In embodiments of the invention the color camera comprises means to add in situ the data of two adjacent color pixels. As can be seen in FIG. 5 each G, Y, Cy and Mg signal corresponds to a simple addition of the data of two neighboring RGB signals. This offers the possibility of adding in situ the data. This reduces the complexity of the calculations and increases the speed with which the data can be collected and processed.

The inventive device offers the benefits of a high sensitivity due to the mosaic sensor in video mode and a high resolution in a still picture mode. In embodiments a high quality still picture mode can be added to a video camera. In embodiments a high quality video mode can be added to a still picture camera. In the latter embodiments the camera preferably comprises means to use the video mode for auto-functions such as auto-focusing, auto white balance or auto exposure via the sensor. An extra advantage is that the video mode can be applied till a relative low scene illumination thanks to the highly sensitive mosaic filter and the fact that no rows are discarded.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. Color camera with light sensitive area (13) comprising light sensitive elements, a color filter layer (12) associated with the sensitive elements comprising Red, Green and Blue (R-G-B) filter layer elements, and a image processor (14) for generating output signals, characterized in that the color filter layer (12) comprises a repetitive sub-pattern of eight adjacent lines or columns, said sub-pattern comprising color filter elements in the following sequence:

line (column) 1: G-R
line (column) 2: B-G
line (column) 3: G-R
line (column) 4: G-B
line (column) 5: G-R
line (column) 6: B-G
line (column) 7: R-G
line (column) 8: B-G.

2. Color camera as claimed in claim 1, characterized in that the color filter layer (12) comprises a QGA RGB color filter array having 1260×960 color pixels.

3. Color camera as claimed in claim 1, characterized in that the color filter layer (12) comprises a XGA color filter array having 1280×1024 color pixels.

4. Color camera as claimed in claim 1, characterized in that the color filter layer (12) comprises a VGA color filter array comprising 640×480 color pixels.

5. Color camera as claimed in claim 1, characterized in that the camera comprises means to operate the camera in a video mode, the camera comprising means to use the video mode for auto-functions.

6. Image sensor comprising light sensitive elements (13) and a color filter layer (12) associated with the sensitive elements comprising Red, Green and Blue (R-G-B) filter layer elements, characterized in that the color filter layer (12) comprises a repetitive sub-pattern of eight adjacent lines or columns, said sub-pattern comprising color filter elements in the following sequence:

line (column) 1: G-R
line (column) 2: B-G
line (column) 3: G-R
line (column) 4: G-B
line (column) 5: G-R
line (column) 6: B-G
line (column) 7: R-G
line (column) 8: B-G.

* * * * *